(12) United States Patent
Monson et al.

(10) Patent No.: US 7,246,785 B2
(45) Date of Patent: Jul. 24, 2007

(54) SHOCK AND VIBRATION ISOLATION STATION WITH QUADRAL SUPPORT

(75) Inventors: Robert James Monson, St. Paul, MN (US); Julia A. Neuman, St. Paul, MN (US); Wesley E. Revely, Apple Vallery, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 426 days.

(21) Appl. No.: 10/439,842

(22) Filed: May 19, 2003

(65) Prior Publication Data
US 2004/0232305 A1    Nov. 25, 2004

(51) Int. Cl.
A47F 5/00        (2006.01)
(52) U.S. Cl. ............... 248/638; 248/562; 248/917
(58) Field of Classification Search ............ 248/610, 248/603, 604, 611, 636, 638, 560, 562, 634, 248/917; 428/71, 119
See application file for complete search history.

(56) References Cited

U.S. PATENT DOCUMENTS

| | | | |
|---|---|---|---|
| 3,565,386 A * | 2/1971 | Lemkuil et al. ............ 248/573 |
| 5,240,222 A * | 8/1993 | Seeley et al. ............... 248/638 |
| 5,314,159 A * | 5/1994 | Szarata ....................... 248/476 |
| 5,786,849 A * | 7/1998 | Lynde ......................... 348/113 |
| 6,417,897 B1 * | 7/2002 | Hashimoto .................. 349/65 |
| 6,554,262 B2 * | 4/2003 | Monson et al. ............. 267/140 |
| 6,672,560 B1 * | 1/2004 | Hart ........................... 248/638 |
| 6,742,776 B2 * | 6/2004 | Monson et al. ............. 267/136 |
| 6,912,523 B2 * | 6/2005 | Mitsugi ........................ 707/3 |

FOREIGN PATENT DOCUMENTS

EP    0 583 946 A1 *   2/1994

* cited by examiner

Primary Examiner—Amy J. Sterling
Assistant Examiner—Steven M. Marsh
(74) Attorney, Agent, or Firm—Jacobson & Johnson

(57) ABSTRACT

A shock isolated operator station wherein a set of quadral elastomer mounts provide substantial static support as well as isolate equipment supported thereon from shock and vibrations forces.

8 Claims, 4 Drawing Sheets

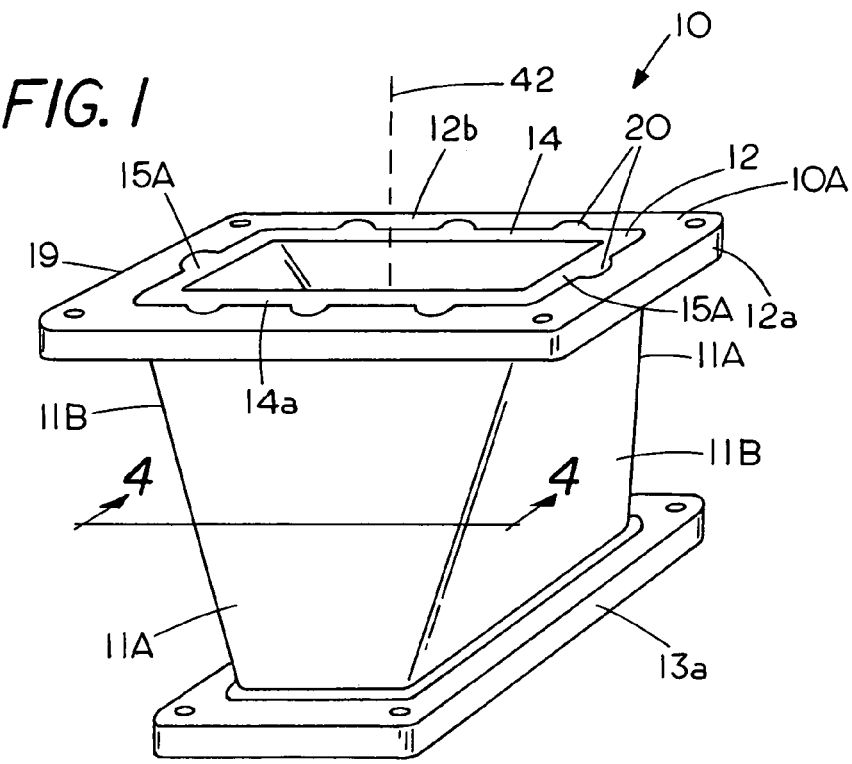
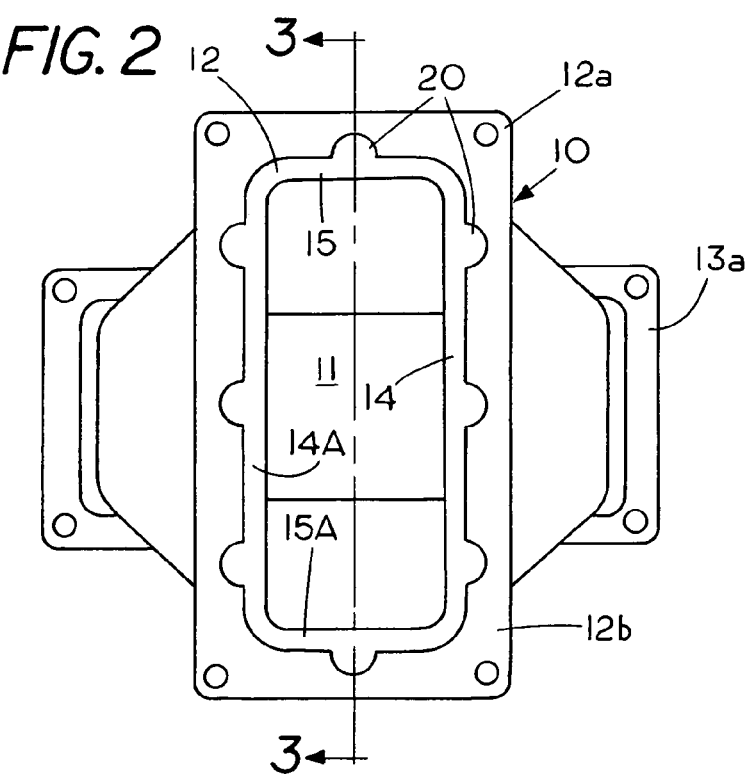

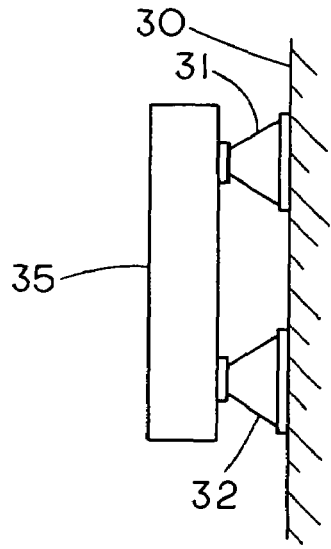
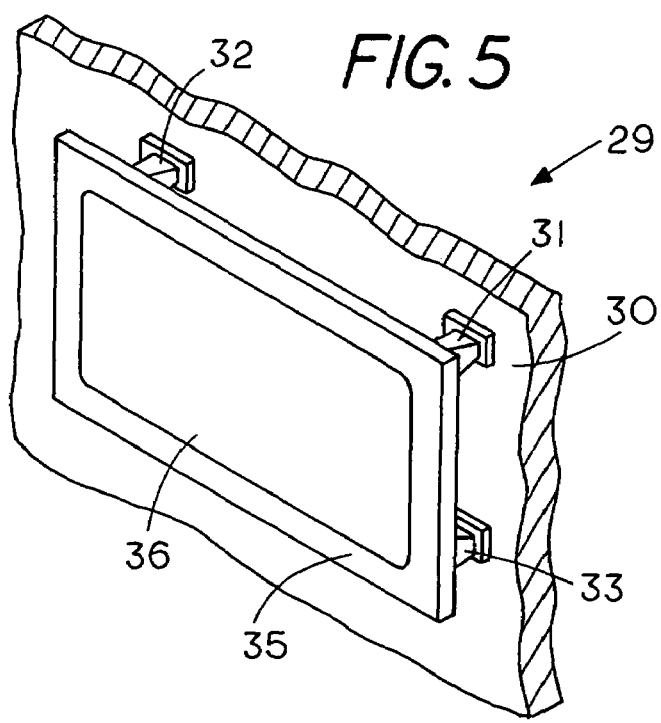
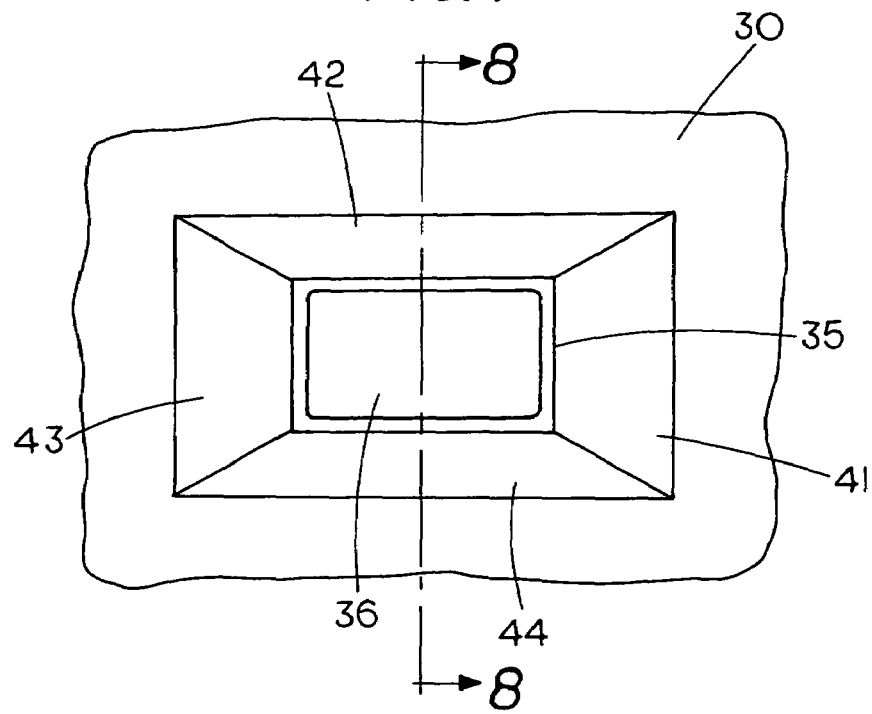

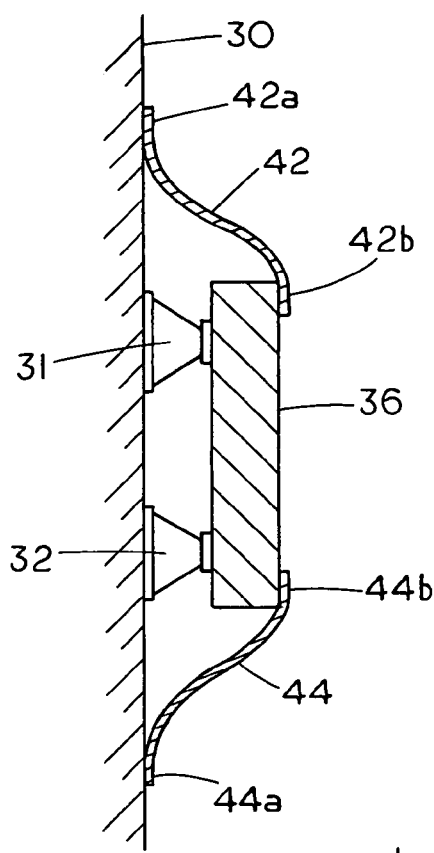
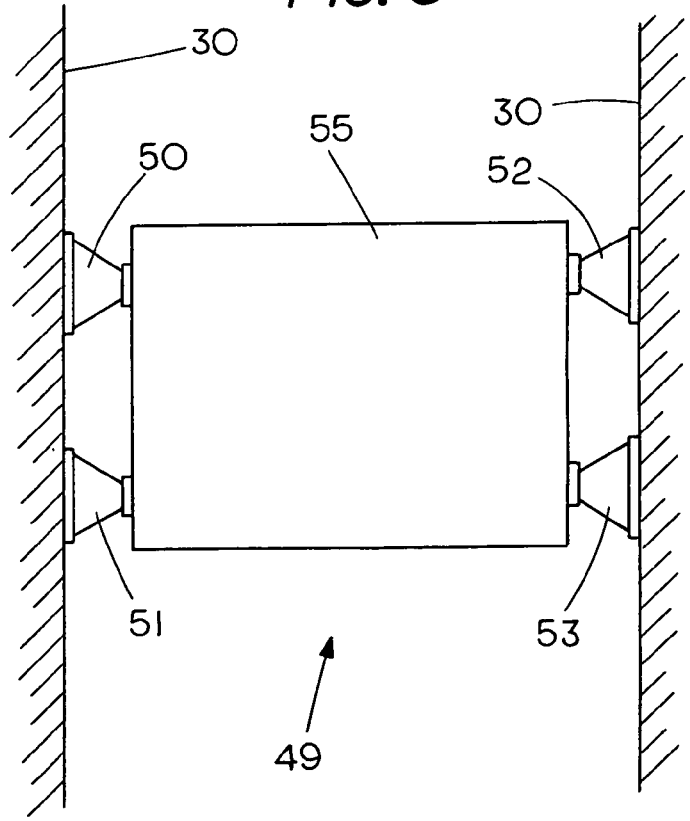

SHOCK AND VIBRATION ISOLATION STATION WITH QUADRAL SUPPORT

FIELD OF THE INVENTION

This invention relates to an operator station and, more specifically, to an operator station having a fragile device carried by a support surface with one or more quadral elastomer mounts that provide both static support and shock and vibration isolation.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

Generally, operator stations contain a support structure and carry fragile equipment such as plasma screens or sensitive electronics that are isolatingly suspended from the support structure in order to isolated the fragile equipment from the shock and vibration forces received by the support structure.

One such use of operator stations is in ships which carry large fragile equipment and other uses include land vehicles. One fragile component that requires protection is the high mass plasma display screen, although other types of fragile components also require protection from the shock and vibration forces received by the support structure. In order to isolate the shock and vibration forces received by the support structure from the fragile equipment some type of independent suspension mounting of the fragile equipment is required. One of the difficulties is the independent mounting of the fragile equipment, such as plasma screens, is that the plasma screens are quite heavy in relation to their size and require substantial mounts to support the static weight of the display. On the other hand the mounts must still be able to absorb a shock force or a vibration force to the support structure in order to protect the fragile equipment while at the same time supporting the static weight of the fragile display.

Various elastomeric materials have been used, or suggested for use, to provide shock and/or vibration damping as stated in U.S. Pat. No. 5,766,720, which issued on Jun. 16, 1998 to Yamagishi, et al. These materials include natural rubbers and synthetic resins such as polyvinyl chlorides, polyurethane, polyamides polystyrenes, copolymerized polyvinyl chlorides, and poloyolefine synthetic rubbers as well as synthetic materials such as urethane, EPDM, styrene-butadiene rubbers, nitrites, isoprene, chloroprenes, propylene, and silicones. The particular type of elastomeric material is not critical but urethane material sold under the trademark Sorbothane Æis currently employed. Suitable material is also sold by Aero E.A.R. Specialty Composites, as Isoloss VL. The registrant of the mark Sorbothane Æfor urethane material is the Hamiltion Kent Manufacturing Company (Registration No. 1,208,333), Kent, Ohio 44240.

Generally, the shape and configuration of elastomeric isolators have a significant effect on the shock and vibration attenuation characteristics of the elastomeric isolators. The elastomeric isolators employed in the prior art are commonly formed into geometric 3D shapes, such as spheres, squares, right circular cylinders, cones, rectangles and the like as illustrated in U.S. Pat. No. 5,776,720. These elastomeric isolators are typically attached to a housing to protect equipment within the housing from the effects of shock and vibration through compression resistance of the isolators.

The prior art elastomeric isolators are generally positioned to rely on an axial compression of the elastomeric material in order to provide both static and dynamic support. Generally, if the elastomeric isolator is loaded in an axial compressive mode, where the force between the spaced-apart flat plates is normal to the support surfaces at all points of the surfaces, the ability of the elastomeric isolator to attenuate shock and vibration is limited by the compressive characteristics of the material. On the other hand if placed in a tension mode the elastomer material is generally limited in the ability to support a static weight but is effective in isolating a load from both shock and vibration forces. Consequently, for support of heavier articles it is preferred to support an article in the axial compressive mode as elastomeric isolators provide substantial static support to a housing, which allows elastomeric isolators to be placed beneath the housing to support the static weight of the housing. However, supporting an article in the compressive mode generally reduces the ability of the elastomer mount to isolate the article from shock and vibration forces.

In general, if the elastomeric isolators are positioned in a shear or tension mode as opposed to an axial compression mode the elastomeric isolators provide better shock and vibration attenuating characteristics in response to dynamic forces due to shock and vibration. Unfortunately, elastomeric isolators, which operate in a shear or tension mode generally do not provide substantial static support. Consequently, to provide static support for a housing, as well as effective shock and vibration attenuation characteristics the elastomeric isolators, which operate in the shear or tension mode, can be placed along side or above a housing so that the elastomeric isolators can function in a shear or tension mode while other mounts either tensionally or compressingly supporting the static weight of the housing. The difficult with such placement is that if the equipment is heavy it is difficult to obtain both the necessary static support and dynamic response in the same type of elastomer isolator.

One type of elastomer isolator, which is shown in my copending patent application Ser. No. 10/261,404 Filed Sep. 30, 2002 and titled FOUR-SIDED ELASTOMER MOUNT discloses a uniquely shaped elastomer that utilizes the shape of the elastomer mount in conjunction with the characteristics of the elastomer to provide static support and at the same time isolation from shock and vibration forces. The mount includes an elongated base at each end with the elongated basses located in a transverse conduit to each other and is herein incorporated by reference.

As pointed out above one of the more sensitive type of fragile equipment in use today are the plasma screens. Typically, the plasma screens require greater shock and vibration protection than other equipment since the rigid nature of glass limits the ability of glass to absorb shock and vibrations without breaking. Yet, the plasma screens can be quite massive and require a strong static supports for supporting the plasma screen. Because of the requirement of providing continuous static support for a heavy or massive object such as the plasma screen and at the same time being able to absorb the shock and vibration forces thereto compression supports are used to support the sensitive plasma screens which can leave the plasma screens subject to damage from large shock and vibration forces on the supporting structure.

It has been found that one can provide an operator station with effective shock and vibration isolation for fragile equipment such as plasma screens, which may have a substantial mass, by use of quadral elastomers that cantileverly support the static weight of the fragile as well as isolating the plasma screen from shock and vibration forces received by the support structure to isolates the plasma screen from shock and vibration.

SUMMARY OF THE INVENTION

An operator station including a support structure subject to shock and vibration forces and fragile equipment which is carried by elastomer mounts with the mounts extending from a housing for the fragile equipment to the support structure to enable the elastomer mounts to simultaneously support the static weight of the fragile equipment while isolating the fragile equipment form shock forces and vibration forces received by the support structure. The elastomer mounts having a first elongated support surface located on a first end of the elastomer material with the first elongated support surface secured to one portion of the housing and a second elongated support surface located on an opposing end of the elastomer material engaging a first portion of the support structure with the first elongated support surface and the second elongated support surface of the first shows isolator being rotationally positioned with respect to each other to provide substantial static support to the fragile device and at the same time isolated the fragile device from shock and vibration.

BRIEF DESCRIPTION OF THE DRAWINGS

FIG. 1 is a perspective of the quadral elastomer having end plates for mounting to a support structure and to a housing carrying fragile equipment;

FIG. 2 is a top view of the quadral elastomer of FIG. 1;

FIG. 5 is a perspective view of a support structure and a fragile plasma screen which is solely supported by a set of quadral elastomer mounts;

FIG. 6 is a side view of the support structure and a fragile plasma screen of FIG. 5 which is solely supported by a set of quadral elastomer mounts.

FIG. 7 is a front view of a plasma screen held on a support structure with a set of bezels located around the peripheral region of the plasma screen;

FIG. 8 is a section view taken along lines 8—8 of FIG. 7; and

FIG. 9 is a front view of opposing support structure supporting sensitive equipment in a position to minimize shock and vibrations forces to the sensitive equipment.

DESCRIPTION OF THE PREFERRED EMBODIMENT

Figure 3:
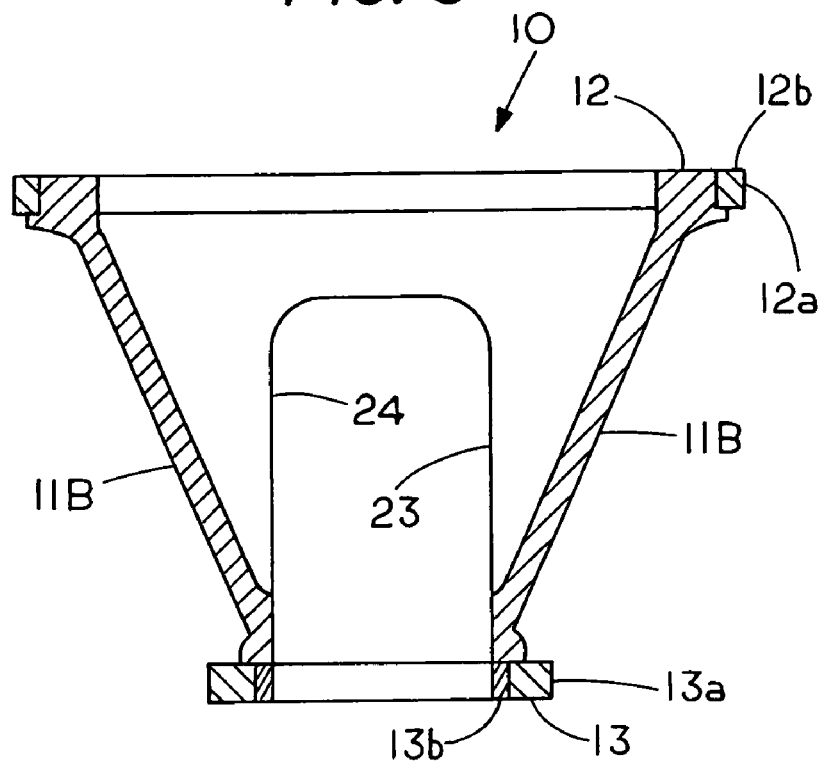
FIG. 3 is a sectional view taken along lines 3—3 of FIG. 2.

FIG. 1 shows a perspective view of the four-sided quadral shock isolator 10 for simultaneously providing shock and vibration attenuation while providing axially offset support for use in the operator station of the present invention. The four-sided quadral shock isolator comprises an open body one piece shock isolator 10 formed from an elastomer material having a set of sidewalls 11A and a set of end walls 11B integrally connected to form an internal chamber 11. In the preferred embodiment the elastomer can be molded as one piece. Located at a first end 10A of elastomer shock isolator 10 is an elongated engagement surface comprising a first elongated-shaped end face 12 with a rigid mounting plate 12b located therearound and extending radially outward therefrom to form a first elongated flange 12a for engaging a first member such as a housing or a cabinet. Similarly, located at the opposite end of shock isolator 10 is an identical elongated flange 13a for engaging a second member such as a support structure.

The quadral mounts of the present invention provide for different dynamic and static response through use of chamber 11. In one mode chamber 11 can be vented to the outside atmosphere though an opening in either a sidewall or in the end plates. The venting to the atmosphere provides a first dynamic response since the air is allowed to flow in and out of chambere 11 in the quadral mount in response to change in volume of the chamber 11. To obtain a different mode one can seal the chamber 11 so that air or gas in the chamber can not escape from the chamber as the quadral mount responds to forces.

The first flange 12a includes two parts, the first is the ring like elastomer support surface 12, which comprises parallel elastomer end surfaces 14 and 14A and parallel elastomer end surfaces 15 and 15A with side surfaces 14 and 14A having a longer length than the end surfaces 15 and 15A. Located around the exterior of first support surface 20 is a second ring like member 12b. Member 12b has relief regions therein so as to forms interlocking engagement with semi-circular shaped elastomer protrusions 20. In the embodiment shown the flange 12a comprises an elastomer portion 12 of a first material and a rigid portion 12b of a different material.

Similarly, the second end includes a second flange 13a which is identical to the first flange 12a and will not be described herein.

A central axis 42 is shown in FIG. 1 extending through the geometric center of chamber 11. In the quadral elastomer 10 the first elongated ring like support surface 12b of shock isolator to is rotationally positioned with respect to the second elongated support surface 13b (FIG. 3) to simultaneously provide shock and vibration attenuation while providing axially offset support. The rotational positioning of the elongated support surfaces 12 and 13 result in the sidewalls 11A of the shock isolator 10 positioned in a nonparallel relationship with respect to each other and with the end walls 11B of the shock isolator 10 also being positioned in a nonparallel relationship with respect to each other. It has been found that the rotational posting of a elongated end plates from each other provides the quadral mount with capacity to provide substantial static support while at the same time providing isolation of shock forces and vibration forces from the equipment.

FIG. 2 shows a top view of four-sided shock isolator 10 to further illustrate the position of the first support surface 12 and 12b, which form flange 12a with respect to the positioning of the second support surface 13 and 13a of the four-sided shock isolator 10 and FIG. 2 illustrate the rotational position of the first elongated-shaped support surface 12 and 12b with respect to the second elongated-shaped support 13 and 13b. Although support surfaces 12 and 12b and 13 and 13b may be at various rotational positions with respect to each other, FIGS. 2 and 3 show the preferred embodiment where elongated flange 12a is rotationally positioned 90° with respect to flange 13a.

FIG. 3 is a cross section view taken along lines 3–3 to show the interior of isolator 10 with a side wall 23 extending from end plate 13a. The side wall 23 has been formed by an interior mold part that can be slid out of the cast elastomer.

Figure 4:
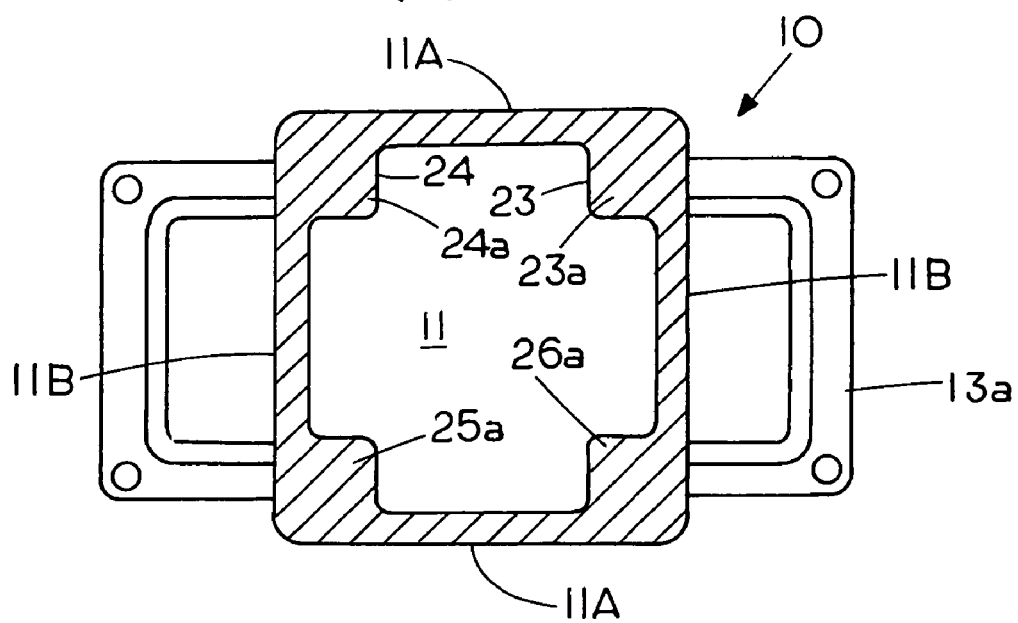
FIG. 4 is a sectional view of the quadral elastomer taken along lines 44 of FIG. 1.

FIG. 4 is a cross sectional view of quadral isolator 10 showing front and rear walls 11A and side walls 11B. In the embodiment shown the side walls 11A and 11B do not have a uniform thickness but vary in thickness as a result of using an internal mold to form the cavity 11 in the elastomer. As a result there exists elastomer ears 23, 24, 25 and 25 which provide additional thickness to the walls without adversely effecting the damping characteristics of the elastomer.

FIG. 5 shows an operator station 29 comprising a support structure 30 with a plasma display panel 36 mounted in a housing 35, which is cantileverly supported on the support structure 30 through a first quadral elastomer shock mount 31, a second quadral elastomer shock mount 32, a third quadral elastomer shock mount 33 and a fourth quadral elastomer shock mount (not shown) with the elastomer shock mounts of the shown in FIGS. 1–4.

With the use of quadral elastomer shock mounts as illustrated in FIG. 14 one can use the quadral elastomer shock mounts to provide the sole static support as well as the sole means of isolating the equipment carried thereon from shock forces and vibrations forces.

FIG. 6 shows a side view of the operator station of FIG. 5 illustrating that quadral elastomer mounts 31 and 31 are located on the top and bottom of the housing 35 to cantileverly support the housing 35 in a spaced condition from support structure 30. In this condition the housing is both statically supported and isolated from shock to the support structure 30 by the quadral elastomer mounts.

FIG. 7 shows an alternate embodiment of the invention wherein a set of four flexible bezels 41, 42, 43 and 44 extend from support structure 30 to housing 35 to further provide support for the display screen 36 as well as a finished look. FIG. 8 shows the first bezel 42 has a first end 42a secured to support structure 30 and a second end 42b secured to hosing 36. Likewise bezel 44 has a first end 44a secured to support structure 30 and a second end 44b secured to housing 35. As the bezels 41 and 43 are identical in mounting and operation they are not described herein.

FIG. 9 shows an alternate embodiment of the present invention wherein fragile equipment 55 is cantileverly suspended on one end by quadral mounts 50 and 51 which each have one end secured to support structure 30 and the other end secured to fragile equipment 55. Similarly, on the opposed end quadral mounts 52 and 53 which each have one end secured to housing 30 and the other end secured to equipment 55 provide cantileverly support with the quadral elastomer mounts isolating the fragile equipment 55 from shock and vibration forces received by support structure 30.

We claim:

1. An operator station comprising:
 a support structure;
 a housing;
 a fragile member carried by said housing, said fragile member susceptible to damage when exposed to a vibration force or the shock force received by said support structure;
 a bezel extending from said housing to said support structure; and
 a quadral elastomer mount, said quadral elastomer mount having a first end secured to said housing and a second end secured to said support structure with the quadral elastomer mount cantileverly supporting said housing in a spaced condition from said support structure while simultaneously protecting the fragile member carried by said housing from the shock force or the vibration force received by the support structure wherein the fragile member comprises a plasma viewing screen and the mount contains an internal chamber with said internal chamber sealed to prevent ingress and egress into the chamber.

2. The operator station of claim 1 wherein the support structure comprises a vertical wall.

3. The operator station of claim 1 wherein the housing includes four corners with a quadral elastomer mount secured to each of the corners and to the support structure.

4. The operator station of claim 1 wherein the housing includes a first end surface and a second end surface with at least one of the quadral elastomer mounted to each end surface to thereby suspend the housing between the quadral elastomers.

5. The operator station of claim 1 including a set of four bezels with each of the bezels extending from a side of said fragile member to said support structure.

6. The operator station of claim 1 wherein the support structure comprises a flat surface.

7. An operator station comprising:
 a support structure;
 a housing;
 a fragile member carried by said housing, said fragile member susceptible to damage when exposed to a vibration force or the shock force received by said support structure;
 a bezel extending from said housing to said support structure; and
 a quadral elastomer mount, said quadral elastomer mount having a first end secured to said housing and a second end secured to said support structure with the quadral elastomer mount cantileverly supporting said housing in a spaced condition from said support structure while simultaneously protecting the fragile member carried by said housing from the shock force or the vibration force received by the support structure wherein the fragile member comprises a plasma viewing screen and wherein the elastomer mount includes an elongated end surface with a hollow extending therethrough.

8. An operator station comprising:
 a support structure;
 a housing;
 a fragile member carried by said housing, said fragile member susceptible to damage when exposed to a vibration force or the shock force received by said support structure;
 a bezel extending from said housing to said support structure; and
 a quadral elastomer mount, said quadral elastomer mount having a first end secured to said housing and a second end secured to said support structure with the quadral elastomer mount cantileverly supporting said housing in a spaced condition from said support structure while simultaneously protecting the fragile member carried by said housing from the shock force or the vibration force received by the support structure wherein the mount contains an internal chamber with said internal chamber vented to a surrounding atmosphere.

* * * * *